May 18, 1943. H. Z. GORA 2,319,501
TESTING EQUIPMENT
Filed Aug. 2, 1940 4 Sheets-Sheet 1

Inventor
Henry Z. Gora.
By Cameron, Kerkam & Sutton Attorneys

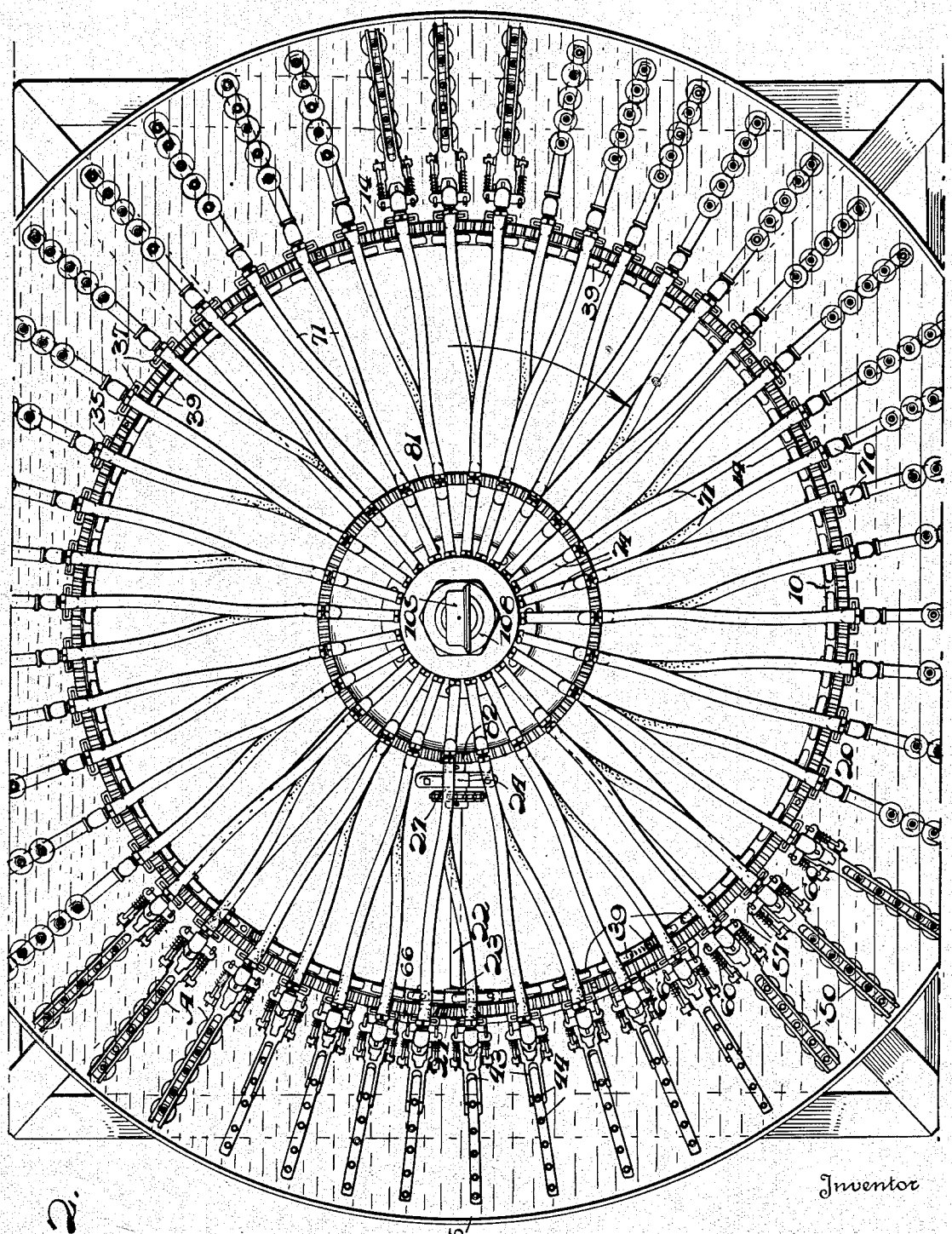

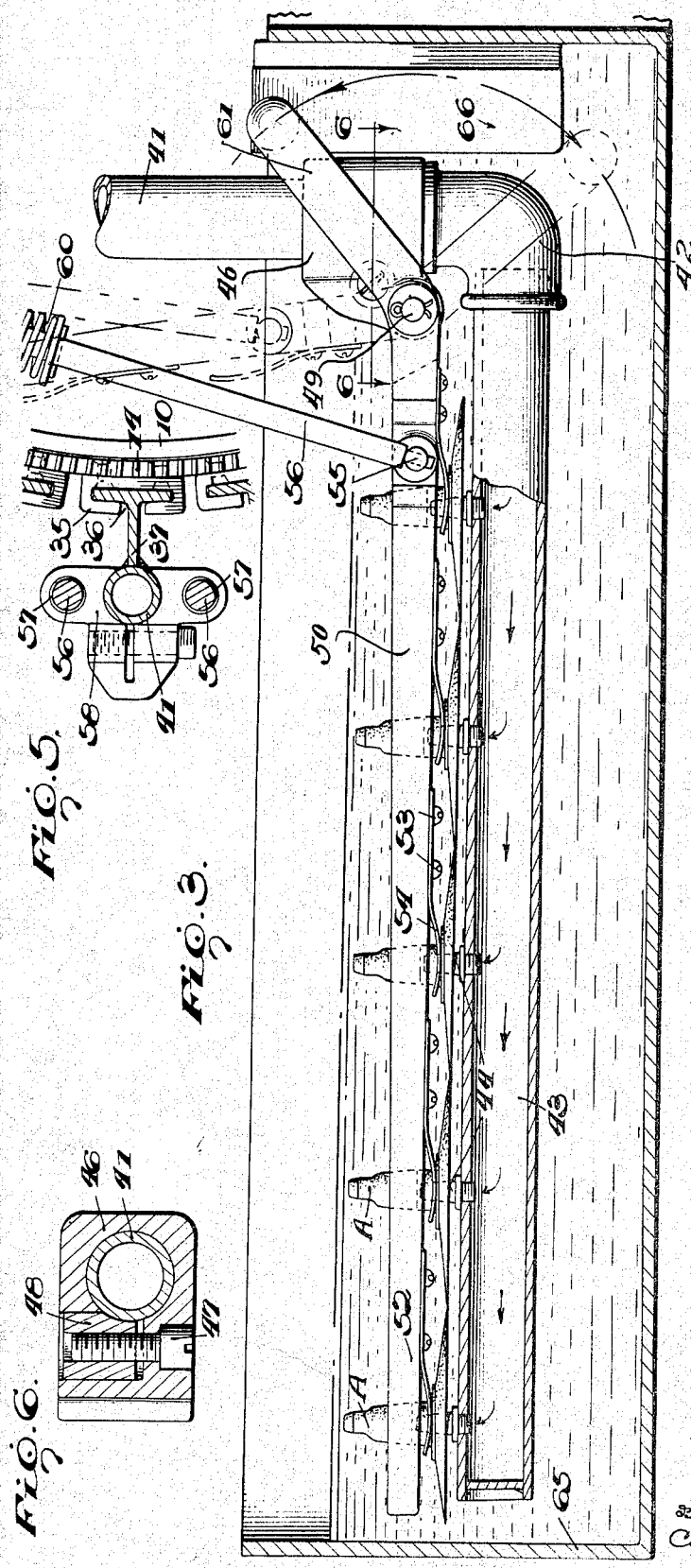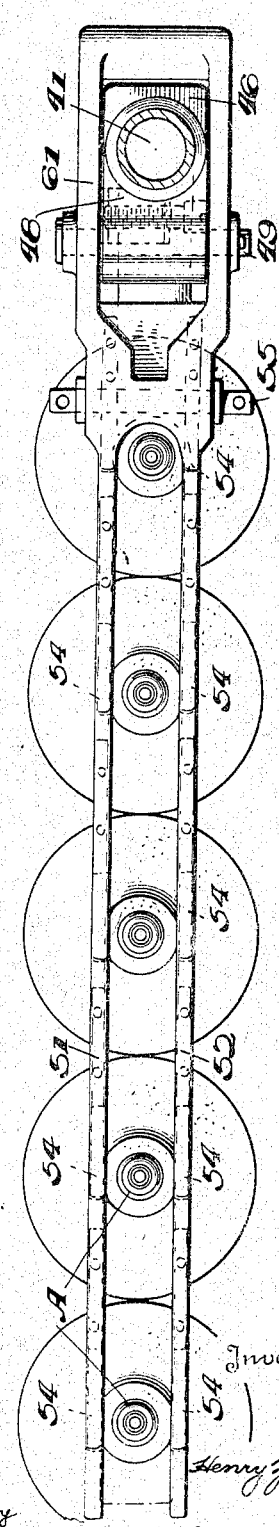

May 18, 1943.  H. Z. GORA  2,319,501
TESTING EQUIPMENT
Filed Aug. 2, 1940  4 Sheets-Sheet 4
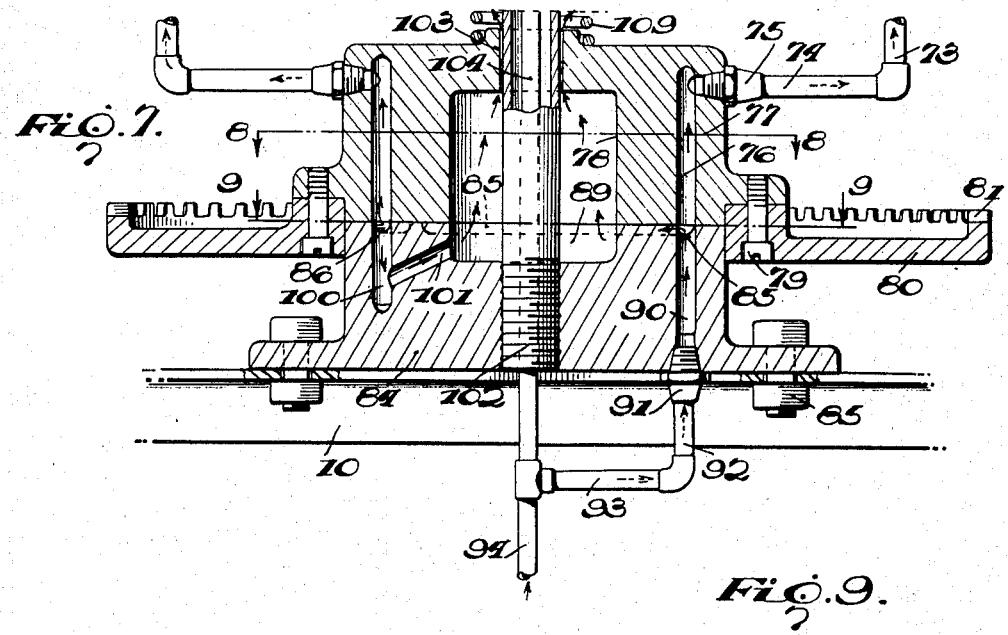
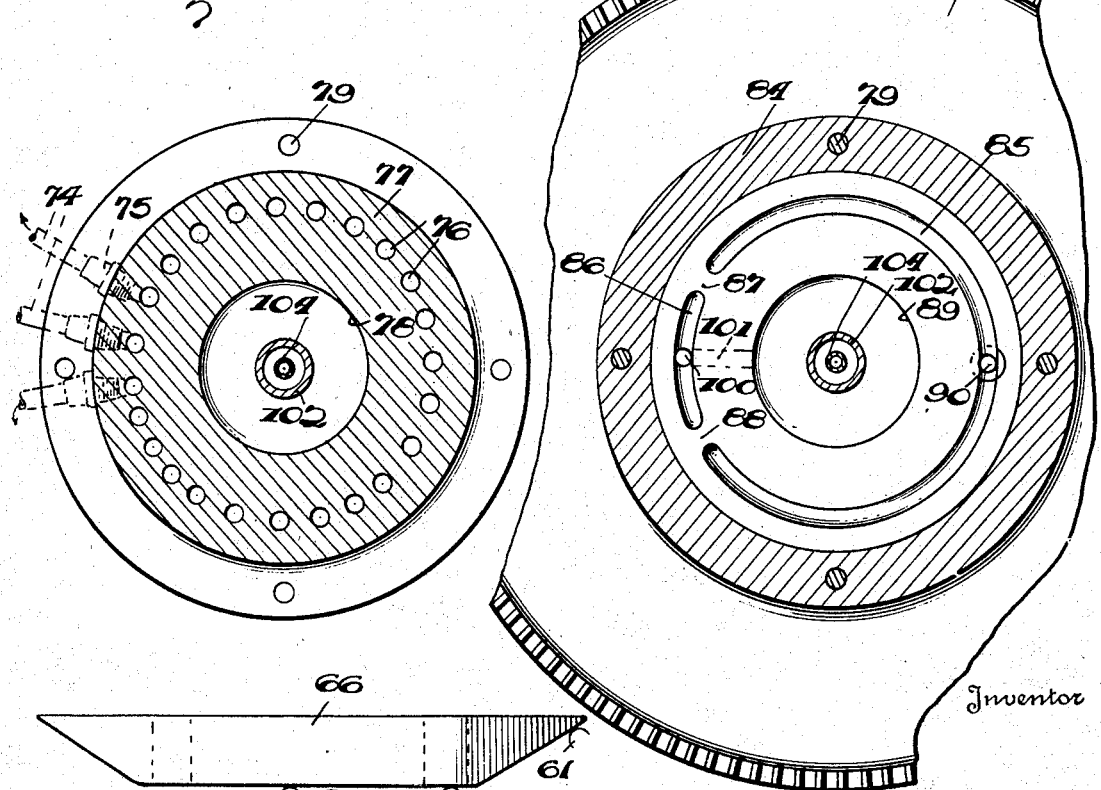
Inventor
Henry Z. Gora.
By Cameron, Kerkam + Sutton
Attorneys Patented May 18, 1943

2,319,501

UNITED STATES PATENT OFFICE 2,319,501

TESTING EQUIPMENT

Henry Z. Gora, Bridgeport, Conn., assignor to Jenkins Bros., New York, N. Y., a corporation of New Jersey Application August 2, 1940, Serial No. 349,552

13 Claims. (Cl. 73—51)

This invention relates to testing equipment, and more particularly to equipment for testing articles under pneumatic pressure while immersed in a liquid. The invention will be exemplified by its embodiment in equipment for testing valve stems for pneumatic tires and the like, but it is to be expressly understood that the invention is of wider utility and, by suitable adaptation, applicable to the testing of a wide variety of articles under compressed air.

It is an object of this invention to provide testing equipment for subjecting a plurality of articles to pneumatic pressure which is automatic in character so that upon assembly of the articles to be tested with the equipment a predetermined testing cycle is carried out without further intervention of the operator.

Another object of this invention is to provide a device of the type characterized which predetermines the time of test without the intervention of the operator.

Another object of this invention is to provide a device of the type characterized with automatically operated means for assuring that the articles under test shall be maintained in their proper relationship to the equipment.

Another object of this invention is to provide a device of the type characterized with automatically operated valve mechanism which assures the desired supply of pneumatic pressure to the articles under test for the predetermined period for which the test is to be carried out.

Another object of this invention is to provide a device of the type characterized with automatically operated means for initiating and terminating the test.

Another object of this invention is to provide a device of the type characterized with means for moving the supports for the articles under test into a convenient location for installing and removing such articles.

Another object of this invention is to provide a device of the type characterized with automatically operated means for releasing the supports for the articles under test from pressure while said supports are in position for installing or removing said articles.

Another object of this invention is to provide a device of the type characterized which is simple and compact in construction and avoids the necessity for using highly skilled labor in operating the same.

Yet other objects of the invention will appear as the description of this invention proceeds.

The invention is capable of receiving a variety of mechanical expressions, only one of which is illustrated on the accompanying drawings, and it is to be expressly understood that the drawings are for purposes of illustration only, and are not to be construed as a definition of the limits of the invention, reference being had to the appended claims for that purpose.

Referring to the accompanying drawings, wherein the same reference characters are employed to designate corresponding parts in the several figures, Fig. 1 is a somewhat diagrammatic elevation of an embodiment of the present invention, parts being shown in section for convenience of illustration;

Fig. 2 is a plan view of the embodiment of Fig. 1 but with much of the detail concerned with the automatically operated supports for the articles to be tested omitted in the interest of clearness of illustration;

Fig. 3 is an enlarged elevation, partly in section, of one of the supports for the articles to be tested and its associated parts;

Fig. 4 is a plan view of the cam-actuated device for holding the articles to be tested on their support;

Fig. 5 is an enlarged cross section on the line 5—5 of Fig. 1;

Fig. 6 is a cross section on the line 6—6 of Fig. 3;

Fig. 7 is a vertical cross section, on an enlarged scale, through the automatically operated valve mechanism;

Fig. 8 is a cross section on the line 8—8 of Fig. 7;

Fig. 9 is a cross section on the line 9—9 of Fig. 7; and

Fig. 10 is a schematic elevation of the cam for operating the means that retain the articles to be tested on their supports.

Figure 1:
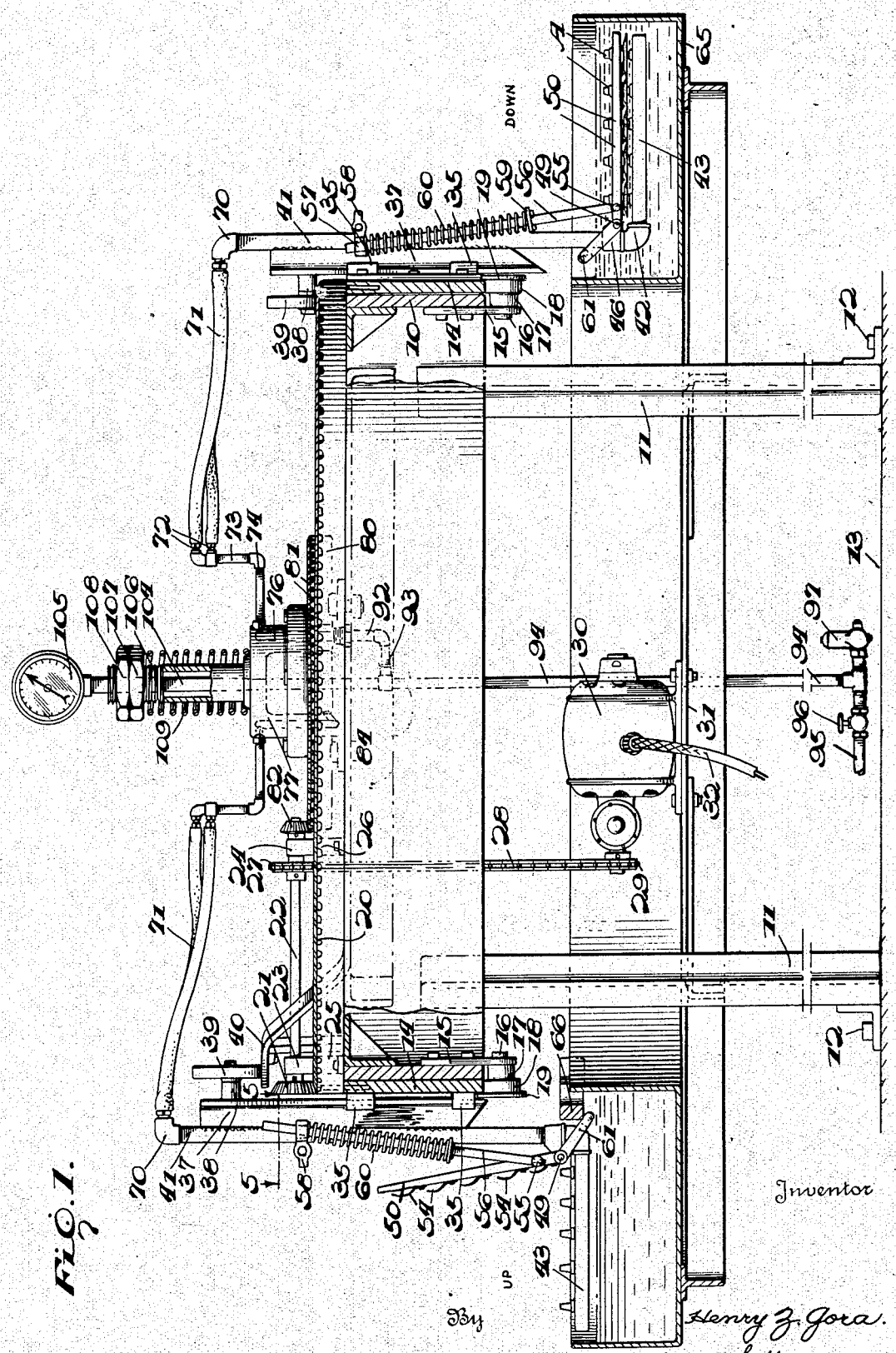

In the form shown, a generally circular table 10 is stationarily supported in any suitable way, as by a plurality of legs 11 that are suitably attached thereto at their upper ends and suitably secured, as by bolts 12 at their lower ends, to any suitable bed plate, foundation or floor 13. Mounted for rotation on and around said table 10 is a ring 14 which surrounds and is centered by the vertical peripheral wall of the table 10. In order that the entire weight of the ring 14 with its associated parts shall not be borne by the hereinafter described mechanism cooperating with the top of the table 10, the ring 14 is also preferably carried by a suitable number of rollers suspended from the stationary table 10. As shown, brackets 15 are suitably secured to the inner face of the rim of the table 10, and at their lower extremities carry axles 16 on which are mounted rollers 17, each of said rollers having a portion 18 which engages the underface of the ring 14 and also by preference a portion 19 of enlarged diameter for guiding the outer peripheral face of said ring 14. While only two of such rollers with their associated supports have been shown in Fig. 1, it is to be understood that any suitable number of such rollers may be used.

The upper peripheral edge of the ring 14 is formed into a rack 20, and cooperating with said rack 20 is a pinion 21 mounted on a shaft 22 having suitable bearings at 23 and 24 in posts 25 and 26 projecting upwardly from the stationary table 10. Also mounted on shaft 22 is a chain gear 27 pinned or otherwise suitably secured to said shaft and connected by chain 28 to the gear 29 mounted on any suitable rotary shaft which might be line shafting but is here shown as the shaft of an electrical motor 30 mounted on a suitable platform 31 secured to the stationary table 10 or its legs 11 and supplied with current through the leads 32.

The ring 14 is provided with any suitable number of slideways in which are slidably mounted the supports for the articles to be tested. In the embodiment illustrated, 48 symmetrically arranged slideways with their associated supports are shown around the periphery of the table, but as obvious to those skilled in the art, this number may be increased or decreased as desired. Said slideways may be of any suitable construction, being shown as in the form of generally rectangular brackets 35 (see Fig. 5) bolted or otherwise suitably secured to the ring 14 and having slots 36 in their outer faces. Said brackets may be continuous for the vertical height of the ring 14 or they may each be composed of two or more separate aligned brackets as shown in Fig. 1. Slidably mounted in the brackets 35 are T-shaped slides 37 which, as shown in Fig. 1, project above the upper edge of the ring 14. At its upper extremity each slide 37 is suitably provided with an inwardly directed lug or pin 38 on which is rotatably mounted a roller 39 that normally rolls on the upper face or edge of the stationary table 10 but which is designed at a certain portion of its traverse to cooperate with a cam 40, mounted in any suitable way on the stationary table 10, to the end that said roller may roll up the incline of said cam 40 from a position corresponding to that shown at the right-hand side of Fig. 1 to the position shown at the left-hand side of Fig. 1 wherein the slide 37 is shown in its upper position for a purpose to be explained.

Suitably mounted on each slide 37 is a vertically extending pipe 41 which at its lower end communicates with an elbow 42 that in turn communicates with a hollow tubular support 43 from the upper face of which projects any suitable number of nipples 44 or other suitable means for receiving the articles to be tested, here shown as tire valves designated A. In the embodiment shown, each tubular support 43 is provided with five such nipples, and each such nipple is shown as of the type suitable for receiving any suitable tire valve A. As hereinafter explained, pneumatic pressure is supplied through the tubes 41 to the hollow supports 43 and may enter the tire valve stems when mounted on the nipples 44, to subject the said tire valves to pneumatic pressure and thereby determine whether they are airtight.

In order to retain the articles, such as the tire valves A, on the nipples 44 during the period when they are subjected to pneumatic pressure, each of said supports 43 has associated therewith automatically operated means for gripping the tire valves under test and retaining the same on said nipples. As here shown, the lower end of each pipe section 41 carries a block 46 which is suitably retained on the pipe 41 as by a bolt 47 and a clamping member 48 (see Fig. 6) which may be drawn into gripping contact with the pipe. Pivoted on each block 46 at 49 (see Figs. 3 and 4) is an arm 50 composed of a pair of parallel side members 51 and 52 spaced at a suitable distance to receive the upwardly projecting stems of the tire valves between the same. Suitably secured to each of said side arms 51 and 52, as by one or more screws 53, are leaf springs 54, corresponding in number to the nipples 44 and suitably located so as to engage the flaps of the tire valves and hold the same securely on their nipples. Pivoted to each arm 51 and 52 at 55 is an upwardly extending arm 56 which may slide freely through a guide 57 suitably formed on or secured to a bracket 58 mounted on the pipe 41 toward the upper end thereof. Interposed between the guides 57 and plates 59 pinned or otherwise suitably secured on the rods 56 are compression springs 60 which normally urge the corresponding arm 50 into its lowermost position as shown at the right of Fig. 1. To lift said arms 50 from the tire valves under test, when the operator's position is reached, each of arms 50 has an angularly directed extension 61 which embraces the pipe 41 and projects on the opposite side of the pivot 49 from the body of the arm 50. Each of said extensions 61 is designed to cooperate with a cam hereinafter referred to.

Suitably mounted on the stationary table 10 or its legs 11, as by the platform 31 heretofore referred to, is a channel-shaped or trough-like annular container or tank 65 adapted to contain water or the like for testing purposes. The water may be fed to said tank 65 in any suitable way, and any suitable means may be provided for automatically assuring that the water level is maintained therein. During the period of test, the slides 37 with their associated hollow supports 43 and the articles being tested suitably retained thereon by their arms 50 are below the surface of the water as shown at the right of Fig. 1. Between the beginning and the end of the testing cycle the supports 43 are elevated above the surface of the water by the coaction of each roller 39 with the cam 40 heretofore referred to, and as the hollow support 43 is raised above the water the corresponding arm 50 is automatically elecated so as to release the articles retained thereby to enable said articles to be removed and a new set thereof to be applied to the corresponding support. To this end, the inner wall of the tank 65 at the operator's station is provided with a suitable cam 66 as shown at the left in Fig. 1, and having the general outline indicated in Fig. 10, and each extension 61 as it arrives at the operator's station is depressed by its engagement with the cam 66, as shown at the left in Fig. 1, so that the arm 50 is swung around its pivot 49, against the tension of the springs 60, to the position shown at the left in Fig. 1, thereby removing the same from gripping engagement with the tire valves or other articles on the hollow support 43.

The pipes 41 heretofore referred to are automatically supplied with pneumatic pressure, and this pressure may be maintained constant throughout the period of test, or if preferred, suitable means may be associated with the equipment for varying the pressure. As shown, each pipe 41 connects through an elbow 70 with a flexible tube 71 that leads to a suitable coupling 72 on an upwardly projecting pipe 73. As shown, there are one-half as many pipes 73 as there are pipes 41, so that each pipe 73 is provided with a pair of couplings 72 for supplying compressed air to a pair of tubes 71 and pipes 41. Each pipe 73 is connected to a horizontally extending pipe 74 that connects through a coupling 75 (see Fig. 7) with a vertically extending passage 76 formed in a rotatable block 77. Block 77 has a central chamber 78 for a purpose to be explained, and at its periphery it carries, as by bolts 79, a depending channel-shaped member 80 which at its outer preiphery is formed into a rack 81. Rack 81 cooperates with a beveled pinion 82 (see Fig. 1) mounted on the shaft 22 heretofore referred to.

Block 77 is rotatably mounted on the upper surface of a stationary block 84 bolted cr otherwise suitably secured as at 85 to the upper face of the stationary table 10, the depending channel-shaped rack member 80 cooperating with the periphery of the block 84 to center and guide the rotatable block 77. The upper face of the stationary block 84 is provided with two arcuate grooves 85 and 86, the former extending throughout a large arc in a circle concentric with the axis of the rotatable block and the latter extending through a small arc in the same circle. Said grooves 85 and 86 are not in communication but are separated from each other by solid portions 87 and 88 at the upper face of the block 84. Said grooves 85 and 86 lie in that circle which corresponds with the line of traverse of the lower ends of the vertically extending passages 76, here shown as 24 in number, which lead to the pipes 74, 73, etc., heretofore referred to. The upper face of stationary block 84 is also provided with a recess 89 in alignment with and constituting an extension of the chamber 78.

Groove 85 is in communication with a vertical passage 90 which extends through the stationary block 84 and at its lower end connects through any suitable coupling 91 with pipes 92 and 93 leading from a vertically extending pipe 94 that projects downwardly (see Fig. 1) where it is connected with any suitable source of compressed air, as through pipe 95 having a hand-controlled valve at 96 and a pressure relief valve at 97.

Groove 86 communicates with a downwardly extending passage 100 in the stationary block 84, and from passage 100 a passage 101 leads to recess 89. Projecting through the chamber 78 and suitably secured in the stationary block 84 is a pipe 102 which makes a clearance 103 with the wall of the aperture in the rotatable block 77 through which said pipe 102 extends. Hence air released into the chamber 78 through passages 100 and 101 may escape to the outside air through the clearance 103. Pipe 94 has an extension above the pipe 93 as shown at 104 in Fig. 7, and as shown in Fig. 1, said pipe extension 104 leads to any suitable pressure indicator 105. To hold the rotatable block 76 in fluid tight engagement with the upper face of stationary block 84, the upper end of pipe 102 is threaded as shown at 106 and carries a nut 107, retained in position by a lock nut 108, between which and the rotatable block 76 is disposed a relatively strong coil spring 109.

The operator's position corresponds to the left of Fig. 1. In this position the rollers 39 have mounted the cam 40 and lifted the slides 37 with their associated supports 43 above the surface of the water in the tank 65, and simultaneously the arms 50 have been cammed to their uppermost positions by the cam 66. The operator removes the articles which have been subjected to test and then mounts on the nipples 44 of each support 43 a new set of articles to be tested. In order to afford the operator sufficient time to remove tested articles and install new articles, cam 40 is so formed that a plurality of supports 43 are simultaneously in their upper position, the horizontal dwell of the cam 40 being selected of such length as to assure that the lapse of time between that period when any given support 43 is elevated by its roller 39 rolling up the incline of cam 40 to raise the support above the water and that period when the same support is lowered by its roller 39 rolling down the opposite incline of the cam 40 to redispose the support 43 below the surface of the water is sufficient for the operator to remove the tested articles and replace them by articles to be tested.

As each roller 39 rolls down the incline on the cam 40, the corresponding support 43 is immersed in the water in the tank 65, and simultaneously therewith, owing to the co-operation of the extension 61 on arm 50 with the cam 66, said arm 50 is moved downwardly, from the position shown at the left of Fig. 1 to the position shown at the right of Fig. 1, by the action of the springs 60 so as to assure that the articles on the support 43 are tightly and securely gripped on their nipples 44.

During the time that each slide 37 is in elevated position owing to the action of the cam 40, its corresponding passage 76 in block 77 is in alignment with the short groove 86 in stationary block 84. Hence air pressure in the articles mounted on support 43 is released through the pipes 41, 71, 73 and 74, the passage 76, groove 86, passages 100 and 101, chamber 78 and clearance 103.

As each support 43 is lowered into the tank its corresponding passage 76 in the block 77 moves from communication with the groove 86 to the long arcuate groove 85. As groove 85 is in communication with a source of compressed air through passage 90 and pipes 92, 93 and 94, each passage 76 supplies compressed air to the articles supported on the corresponding support 43 through the passage 76 and pipes 74, 73, 71 and 41 leading to the hollow support 43, so that said articles are subjected to the testing pressure as soon as said articles are immersed in the water. Hence for the greater period of the rotation of the ring 14 each set of articles on a support 43 is entirely immersed in the water in tank 65 while it is subjected to the desired pneumatic pressure supplied thereto through the hollow support 43 and the passages and pipes communicating therewith. If any of said articles is not airtight, this fact will be indicated by the leaking air appearing as bubbles in the water of tank 65, and hence such leaky article may be appropriately marked so that it will be segregated when it reaches the operator's station and released as heretofore explained.

The ring 14 is thus continuously in movement. Articles to be tested are mounted on the hollow supports 43 by the operator at the operator's stand, and then in automatic sequence the supports are lowered beneath the water in the tank 65, the gripping arms 50 are applied thereto to securely retain the articles on their nipples, compressed air is automatically admitted thereto by the corresponding passage 76 moving into communication with the groove 85, and for a predetermined period of time corresponding with the length of time that it takes the inner end of each passage 76 to traverse the entire length of the groove 85, the articles mounted on the support 43 are under observation to detect any leak. At the expiration of that period the slide 37 is elevated by the cam 40 to release the clamping arm 50 and move the support 43 into appropriate position for removal of the tested articles. Before the clamping arm is elevated to release the articles under test the inner end of the corresponding passage 76 moves into communication with the short arcuate passage 86 and releases the pressure from the articles under test, so that they are not subjected to the test pressure when the arm 50 is raised preliminarily to removal by the operator.

It will therefore be perceived that by the present invention a testing machine has been provided which is continuous and automatic in operation, which assures that the tested articles are securely retained on their supports, which provides automatically for the admission and exhaust of the compressed air after suitable lapses of time, which affords the operator adequate time to remove tested articles and install new articles to be tested, and which is relatively simple and compact in structure, strong, durable and efficient, and readily operable by unskilled labor.

While the embodiment of the invention illustrated on the drawings has been described with considerable particularity, it is to be understood that the invention is not limited thereto, as the same may receive a variety of mechanical expressions, some of which will now readily suggest themselves to those skilled in the art, while changes may be made in the details of construction, arrangement and proportions of parts, certain features may be used without other features, and parts may be replaced by equivalent parts, without departing from the spirit of this invention. Reference is therefore to be had to the appended claims for a definition of this invention.

What is claimed is:

1. In an apparatus for automatically testing tire valve stems under pneumatic pressure, the combination of a rotatable member, a plurality of vertically movable slides carried by said member, each slide carrying a support adapted to receive one or more valve stems and provided with means to supply them with compressed air, a stationary annular tank concentrically arranged with respect to said rotatable member and within which tank said supports move during the period of test, said tank adapted to contain a liquid in which said valve stems are immersed and through which said stems move during the period of test, and cam mechanism operated by rotation of said member for moving said slides upwardly and downwardly to lift said supports in turn above the surface of the liquid in said tank to receive valve stems to be tested and thereafter to depress said supports below said surface to begin the test period.

2. In an apparatus for automatically testing tire valve stems under pneumatic pressure, the combination of a rotatable member, a plurality of vertically movable slides carried by said member, each slide carrying a support adapted to receive one or more valve stems and provided with means to supply them with compressed air, a tank in which said valve stems are immersed during the period of test, cam mechanism operated by rotation of said member for moving said slides upwardly and downwardly to lift said supports in turn above the surface of the liquid in said tank to receive valve stems to be tested and thereafter to depress said supports below said surface to begin the test period, and cam actuated gripping mechanism pivotally mounted on each support and operated by rotation of said member for holding said valve stems on said supports while the latter are depressed.

3. In an apparatus for automatically testing tire valve stems under pneumatic pressure, the combination of a rotatable member, a plurality of vertically movable slides carried by said member, each slide carrying a support adapted to receive one or more valve stems and provided with means to supply them with compressed air, a tank in which said valve stems are immersed during the period of test, cam mechanism operated by rotation of said member for moving said slides upwardly and downwardly to lift said supports in turn above the surface of the liquid in said tank to receive valve stems to be tested and thereafter to depress said supports below said surface to begin the test periods, a pivotal clamping arm mounted on each support and resiliently urged into clamping position with the valve stems on said support, and cam means engaging and moving said arms to release said valve stems when said supports are in elevated position.

4. In an apparatus for automatically testing tire valve stems under pneumatic pressure, the combination of a rotatable member, a tank in which said valve stems are immersed during the period of test, a plurality of vertically movable slides carried by said member, a support carried by each slide for immersion in said tank and provided with one or more nipples to receive valve stems to be tested and with means to supply them with compressed air, means on each support for clamping said valve stems on said nipples, stationary cam means engaged in turn by said slides as said member rotates to lift said supports out of the tank to receive valve stems to be tested, and separate stationary cam means engaged in turn by said clamping means to release tested valve stems from said nipples when said supports are in elevated position.

5. In an apparatus for automatically testing tire valve stems under pneumatic pressure, the combination of a rotatable member, a tank in which said valve stems are immersed during the period of test, a plurality of vertically movable slides carried by said member, a support carried by each slide for immersion in said tank and provided with one or more nipples to receive valve stems to be tested and with means to supply them with compressed air, an arm pivoted on each support for clamping said valve stems on said nipples, resilient means normally maintaining said arm in clamping position, stationary cam means engaged in turn by said slides as said member rotates to lift said supports out of the tank to receive valve stems to be tested, and separate stationary cam means engaged in turn by said arms to move them out of clamping position when said supports are in elevated position.

6. In an apparatus for automatically testing tire valve stems under pneumatic pressure, the combination of a rotatable member, a tank in which said valve stems are immersed during the period of test, a plurality of vertically movable slides carried by said member, a support carried by each slide for immersion in said tank and provided with a plurality of aligned nipples to receive valve stems to be tested and with means to supply them with compressed air, an arm pivoted on each support and aligned with said nipples for clamping said valve stems thereon, and cam mechanism for lifting each of said slides in turn and moving said arms to release the tested valve stems for removal and replacement by untested valve stems.

7. In an apparatus for testing tire valve stems under pneumatic pressure, the combination of a tank in which said valve stems are immersed for test, a supporting member, means carried by said member for holding valve stems to be tested immersed in said tank, said means comprising a support mounted on said member for vertical movement relative thereto, one or more nipples on said support supplied with compressed air and adapted to receive valve stems to be tested, clamping means pivotally mounted on said support for holding valve stems on said nipples, and means for lifting said support out of said tank and for releasing said clamping means to release tested valve stems for removal from said nipples.

8. In an apparatus for testing tire valve stems under pneumatic pressure, the combination of a tank in which said valve stems are immersed for test, a supporting member, means carried by said member for holding valve stems to be tested immersed in said tank, said means comprising a support mounted on said member for vertical movement relative thereto, a plurality of aligned nipples on said support supplied with compressed air and adapted to receive valve stems to be tested, a clamping device mounted on and movable with respect to said support and aligned with said nipples for holding valve stems thereon, means normally maintaining said device in clamping position, and means for lifting said support out of said tank and for releasing said device to release tested valve stems for removal from said nipples.

9. In an apparatus for testing tire valve stems under pneumatic pressure, the combination of a tank in which said valve stems are immersed for test, a supporting member, means carried by said member for holding valve stems to be tested immersed in said tank, said means comprising a support mounted on said member for vertical movement relative thereto, a plurality of aligned nipples on said support supplied with compressed air and adapted to receive valve stems to be tested, a clamping arm pivoted on said support and aligned with said nipples, resilient means normally maintaining said arm in clamping position, and means for periodically lifting said support out of the tank and moving said clamping arm out of operative position to enable replacing tested valve stems with untested valve stems.

10. In an apparatus for testing tire valve stems under pneumatic pressure, a tank in which said valve stems are immersed for test, a vertically movable valve stem support comprising a hollow tubular member supplied with compressed air and having a plurality of aligned nipples communicating with its hollow interior and each adapted to receive a valve stem to be tested, means mounted on said support and movable with respect thereto for clamping said valve stems on said nipples during the test period, and means for lowering said support to immerse said valve stems in said tank during the test period and for raising said support out of the tank thereafter.

11. In an apparatus for testing tire valve stems under pneumatic pressure, a tank in which said valve stems are immersed for test, a vertically movable valve stem support comprising a hollow tubular member supplied with compressed air and having a plurality of aligned nipples communicating with its hollow interior and each adapted to receive a valve stem to be tested, a clamping device pivotally mounted on said support and movable into clamping position with said aligned valve stems during the period of test, and means for lowering said support to immerse said valve stems in said tank during the test period and for raising said support out of the tank and releasing said clamping means thereafter.

12. In an apparatus for testing tire valve stems under pneumatic pressure, a tank in which said valve stems are immersed for test, a vertically movable valve stem support comprising a hollow tubular member supplied with compressed air and having a plurality of aligned nipples communicating with its hollow interior and each adapted to receive a valve stem to be tested, a clamping device mounted on said support and movable thereon into clamping position with said aligned valve stems, resilient means maintaining said device in clamping position during the test period, means for lowering said support to immerse said valve stems in said tank during the test period and for raising said support out of the tank thereafter, and separate means for moving said device to release said valve stems when said support is in elevated position.

13. In an apparatus for automatically testing tire valve stems under pneumatic pressure, a rotatable supporting means, a tank in which said valve stems are immersed for test, a plurality of valve stem supports mounted on said supporting means and moving in said tank throughout a predetermined circumferential portion of their travel, cam means for lifting said supports out of said tank in the remaining circumferential portion of their travel, and means for supplying compressed air to said supports during said predetermined portion and venting them during said remaining portion of their travel comprising a member rotating in synchronism with said supporting means and having a plurality of ducts each connected with one of said supports and a stationary member cooperating with said rotating member and having arcuate grooves lying in the circular path of movement of said ducts and registering therewith, one of said grooves being an air supply passage corresponding in circumferential extent with said predetermined portion of travel of said supports and the other groove being an air vent passage corresponding in circumferential extent with said remaining portion.

HENRY Z. GORA.